United States Patent
Discekici et al.

(10) Patent No.: US 12,103,230 B2
(45) Date of Patent: Oct. 1, 2024

(54) THREE-DIMENSIONAL PRINTING

(71) Applicant: HEWLETT-PACKARD DEVELOPMENT COMPANY, L.P., Spring, TX (US)

(72) Inventors: Emre Hiro Discekici, San Diego, CA (US); Shannon Reuben Woodruff, San Diego, CA (US); Carolin Fleischmann, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 142 days.

(21) Appl. No.: 17/758,157

(22) PCT Filed: Jan. 20, 2020

(86) PCT No.: PCT/US2020/014273
§ 371 (c)(1),
(2) Date: Jun. 29, 2022

(87) PCT Pub. No.: WO2021/150201
PCT Pub. Date: Jul. 29, 2021

(65) Prior Publication Data
US 2023/0063606 A1    Mar. 2, 2023

(51) Int. Cl.
*B29C 64/165*  (2017.01)
*B33Y 10/00*  (2015.01)
(Continued)

(52) U.S. Cl.
CPC ............ *B29C 64/165* (2017.08); *B33Y 10/00* (2014.12); *B33Y 70/00* (2014.12); *C08K 5/09* (2013.01)

(58) Field of Classification Search
CPC ....... B29C 64/165; B33Y 10/00; B33Y 70/00; C08K 5/09
See application file for complete search history.

(56) References Cited

U.S. PATENT DOCUMENTS

| | | | |
|---|---|---|---|
| 7,455,804 B2 * | 11/2008 | Patel | B33Y 10/00 264/460 |
| 2005/0080191 A1 * | 4/2005 | Kramer | B33Y 70/00 525/191 |

(Continued)

FOREIGN PATENT DOCUMENTS

| | | |
|---|---|---|
| EP | 2001656 A2 | 12/2008 |
| WO | 2015/200173 A1 | 12/2015 |

(Continued)

OTHER PUBLICATIONS

E-Beam crash Course: Amorphous vs Crystalline Polymers (Advaced) youtube.com/watch?v=3S-SLnbCUh0 transcript (Year: 2018).*

(Continued)

*Primary Examiner* — Farah Taufiq
(74) *Attorney, Agent, or Firm* — Dierker & Kavanaugh, P.C.

(57) ABSTRACT

An example of a kit for three-dimensional printing includes a build material composition and a crosslinking agent to be applied to at least a portion of the build material composition during 3D printing. The build material composition of the kit includes an amorphous polymeric material. The crosslinking composition of the kit includes a crosslinking agent to crosslink with the amorphous polymeric material in the at least the portion, to yield a crosslinked polymer network.

16 Claims, 2 Drawing Sheets

(51) Int. Cl.
    *B33Y 70/00*     (2020.01)
    *C08K 5/09*     (2006.01)

(56) References Cited

U.S. PATENT DOCUMENTS

| | | | |
|---|---|---|---|
| 2016/0067917 A1* | 3/2016 | Hirata | B29C 64/35 |
| | | | 106/190.1 |
| 2017/0225394 A9 | 8/2017 | Rodgers | |
| 2018/0050130 A1 | 2/2018 | Jiang et al. | |
| 2019/0010463 A1 | 1/2019 | Matheu et al. | |
| 2019/0339257 A1 | 11/2019 | Miklas et al. | |

FOREIGN PATENT DOCUMENTS

| | | |
|---|---|---|
| WO | 2019/043137 A1 | 3/2019 |
| WO | 2019/079292 A1 | 4/2019 |

OTHER PUBLICATIONS

Dimethyl Succinate atamanchemicals.com/dimethyl-succinate_u25688/ (Year: 2020).*

* cited by examiner

THREE-DIMENSIONAL PRINTING

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material (which, in some examples, may include build material, binder and/or other printing liquid(s), or combinations thereof). This is unlike traditional machining processes, which often rely upon the removal of material to create the final part. Some 3D printing methods use chemical binders or adhesives to bind build materials together. Other 3D printing methods involve at least partial curing, thermal merging/fusing, melting, sintering, etc. of the build material, and the mechanism for material coalescence may depend upon the type of build material used. For some materials, at least partial melting may be accomplished using heat-assisted extrusion, and for some other materials (e.g., polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
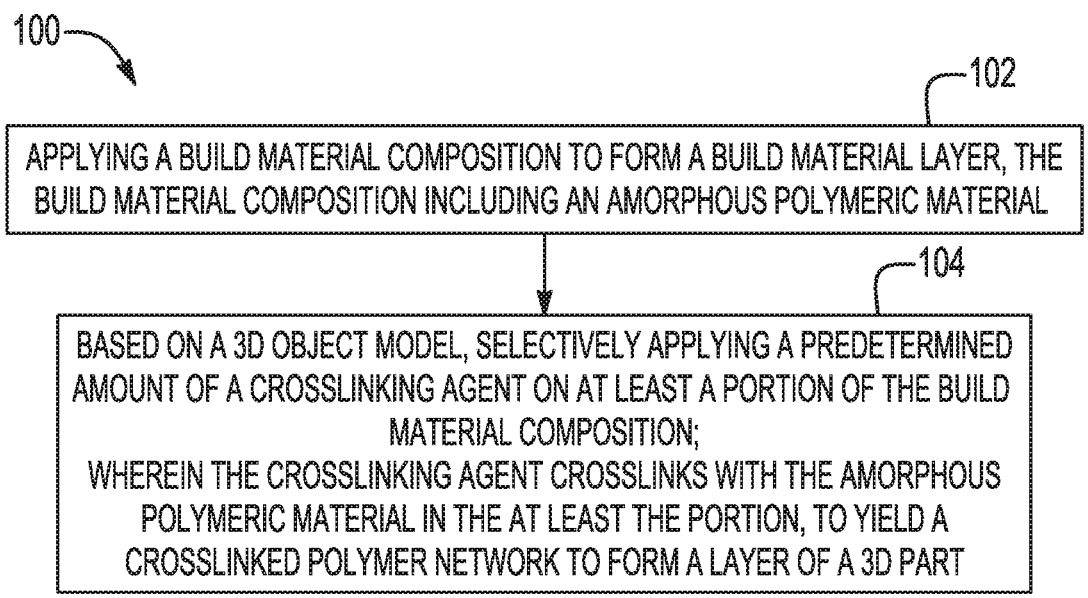
FIG. 1 is a flow diagram illustrating an example of a method for 3D printing.

In the 3D printing method disclosed herein, a crosslinked polymer network can be formed with an amorphous polymeric material and a crosslinking agent.

The method involves low temperature heating (e.g., from about 80° C. to about 140° C.), which is particularly suitable for amorphous polymeric materials. Amorphous polymeric materials lack discrete melting peaks and processing windows, which the present inventors have found renders them non-conducive for use in 3D printing processes that involve excessive heating (e.g., greater than or equal to 150° C.) to achieve fusing. Low temperature heating also reduces, and in some instances eliminates, issues associated with thermal-based fusing, such as thermal bleed, part shrinkage, etc.

The method also involves voxel level control over the amount of crosslinking agent that is applied as well as over the position at which the crosslinking agent is applied. Voxel level control is enabled, at least in part, by the fact that the crosslinking agent is incorporated into an inkjettable formulation. Voxel level control leads to 3D printed objects that exhibit dimensional accuracy, precision, and a desired level of crosslinking.

The ability to use amorphous polymeric materials also broadens the types of 3D objects that can be formed. For example, amorphous polymeric materials may be more suitable, e.g., than crystalline or semi-crystalline polymeric materials, in life science and/or biological applications. The crosslinking agent can also be selected to be biologically compatible with a particular life science and/or biological application, such as regenerative medicine, tissue printing, drug delivery devices, etc.

Definitions

Terms used herein will be understood to take on their ordinary meaning in the relevant art unless specified otherwise. Several terms used herein and their meanings are set forth below.

As used herein, the singular forms "a," "an," and "the" refer to both the singular as well as plural, unless the context clearly indicates otherwise. The term "comprising" as used herein is synonymous with "including," "containing," or "characterized by," and is inclusive or open-ended and does not exclude additional, unrecited elements or method steps.

Reference throughout the specification to "an example," "one example," "another example," and so forth, means that a particular element (e.g., feature, structure, composition, configuration, and/or characteristic) described in connection with the example is included in at least one example described herein, and may or may not be present in other examples. In addition, it is to be understood that the described elements for any example may be combined in any suitable manner in the various examples unless the context clearly dictates otherwise.

As used herein, a "color" may be defined using the CIELAB color space. This color space expresses color as three values: the lightness value, $L^*$, and the color channel values $a^*$ and $b^*$. $L^*$ ranges from the darkest black ($L^*=0$) to the brightest white (100). $a^*$ and $b^*$ represent true neutral gray values at $a^*=0$ and $b^*=0$. The $a^*$ axis represents the green-red component, with green in the negative direction and red in the positive direction. The $b^*$ axis represents the blue-yellow component, with blue in the negative direction and yellow in the positive direction.

The terms "about" and "substantially" as used throughout this disclosure, including the claims, are used to describe and account for small fluctuations, such as due to variations in processing. For example, these terms can refer to less than or equal to ±10% from a stated value, such as less than or equal to ±5% from a stated value, such as less than or equal to ±2% from a stated value, such as less than or equal to ±1% from a stated value, such as less than or equal to ±0.5% from a stated value, such as less than or equal to ±0.2% from a stated value, such as less than or equal to ±0.1% from a stated value, such as less than or equal to ±0.05% from a stated value.

The terms "colorless" and "substantially colorless" as used herein, refer to a composition or component that is transparent or translucent. A transparent or translucent composition or component has a total transmittance of 90% or more, as calculated by:

Total Transmittance=100% incident light−(% absorption+% reflection)

Throughout this disclosure, a weight percentage that is referred to as "wt % active" refers to the loading of an active component of a dispersion or other formulation that is present in, e.g., the crosslinking composition, a coloring agent, etc. For example, a pigment may be present in a water-based formulation (e.g., a stock solution or dispersion) before being incorporated into the coloring agent. In this example, the wt % actives accounts for the loading (as a weight percent) of the pigment solids that are present in the coloring agent, and does not account for the weight of the other components (e.g., water, co-solvent(s), etc.) that are present in the stock solution or dispersion with the pigment. The term "wt %," without the term actives, refers to either i) the loading (in the respective agent) of a 100% active component that does not include other non-active components therein, or ii) the loading (in the respective agent) of a material or component that is used "as is" and thus the wt % accounts for both active and non-active components.

Build Material Compositions

Disclosed herein is a build material composition that includes the amorphous polymeric build material.

Any amorphous polymeric material may be used. The molecular weight, and thus the structure, of the amorphous polymeric material may affect the mechanical properties of the 3D object that is formed. In some examples, the amorphous polymeric material has a weight average (Mw) molecular weight ranging from about 20,000 to about 500,000. All molecular weight values are in units of g/mol or Daltons. In other examples, the amorphous polymeric material has a weight average molecular weight ranging from about 20,000 to about 30,000.

In an example, the amorphous polymeric material is selected from the group consisting of polyvinyl alcohol, polyhydroxyethyl methacrylate, polyhydroxyethyl acrylate, polyvinyl acetate, copolymers thereof, and combinations thereof. Some examples of suitable copolymer include poly(ethyleneglycol)-co-poly(vinyl acetate), poly(methyl methacrylate-co-poly(hydroxyethyl methacrylate), etc.

In some examples, the amorphous polymeric material may be in the form of a powder. In other examples, the amorphous polymeric material may be in the form of a powder-like material, which includes, for example, short fibers having a length that is greater than its width. In some examples, the powder or powder-like material may be formed of, or may include, short fibers that may, for example, have been cut into short lengths from long strands or threads of material.

The amorphous polymeric material may be made up of similarly sized particles or differently sized particles. In an example, the average particle size of the amorphous polymeric material ranges from about 2 μm to about 200 μm. In another example, the average particle size of the amorphous polymeric material ranges from about 15 μm to about 110 μm. In still another example, the average particle size of the amorphous polymeric material is about 100 μm. The term "particle size", as used herein, refers to the diameter of a spherical particle, or the average diameter of a non-spherical particle (i.e., the average of multiple diameters across the particle), or the volume-weighted mean diameter of a particle distribution. The particle size of any solids herein, including the average particle size of the amorphous polymeric material, can be determined using a NANOTRAC® Wave device, from Microtrac, e.g., NANOTRAC® Wave II or NANOTRAC® 150, etc., which measures particle size using dynamic light scattering. Average particle size can be determined using particle size distribution data generated by the NANOTRAC® Wave device.

The amorphous polymeric material may be white in color. In an example, the L* value of the amorphous polymeric material ranges from about 80 to about 100. Because the amorphous polymeric material is so white, the build material composition may be devoid of an additional whitener, such as titanium dioxide ($TiO_2$), zinc oxide (ZnO), calcium carbonate ($CaCO_3$), zirconium dioxide ($ZrO_2$), aluminum oxide ($Al_2O_3$), silicon dioxide ($SiO_2$), boron nitride (BN), and combinations thereof. As used herein, the term "devoid of" when referring to a component (such as, e.g., the whitener, etc.) may refer to a composition that does not include any added amount of the component, but may contain residual amounts, such as in the form of impurities. The components may be present in trace amounts, and in one aspect, in an amount of less than 0.1 weight percent (wt %) based on the total weight of the composition (e.g., the build material composition), even though the composition is described as being "devoid of" the component. In other words, "devoid of" a component may mean that the component is not specifically included, but may be present in trace amounts or as an impurity inherently present in certain ingredients.

Some examples of the build material composition include 100% of the amorphous polymeric material. In these examples, the build material composition consists of the amorphous polymeric material. Other examples of the build material composition may include additives, such as a flow aid, an antioxidant, an antistatic agent, or a combination thereof, in addition to the amorphous polymeric material.

In addition to the amorphous polymeric material, the build material composition may also include a flow aid. The flow aid improves the coating flowability of the amorphous polymeric material particles, and enables the amorphous polymeric material particles to be spread into thin, substantially uniform layers. The flow aid improves the flowability of the amorphous polymeric material particles by reducing the friction, the lateral drag, and the tribocharge buildup (by increasing the particle conductivity). Examples of suitable flow aids include aluminum oxide ($Al_2O_3$), tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), fused metal oxide (e.g., the AEROXIDE® series, available from Evonik) calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), and polydimethylsiloxane (E900).

In an example, the flow aid is added in an amount ranging from greater than 0 wt % to less than 5 wt %, based upon the total weight of the build material composition. As one example, the build material composition includes from greater than 95 wt % to less than 100 wt % of the amorphous polymeric material particles and from greater than 0 wt % to less than 5 wt % of the flow aid. In another example, the build material composition includes from about 0.05 wt % to about 1.5 wt % of the flow aid.

In addition to the amorphous polymeric material and the flow aid, the build material composition may also include an antioxidant, an antistatic agent, or a combination thereof.

Antioxidant(s) may be added to the build material composition to prevent or slow molecular weight decreases of the amorphous polymeric material and/or may prevent or slow discoloration (e.g., yellowing) of the amorphous polymeric material by preventing or slowing oxidation of the amorphous polymeric material. The antioxidant may be selected to minimize discoloration. Examples of suitable antioxidants include hindered phenols, phosphites, and organic sulfites. The antioxidant may be in the form of fine particles (e.g., having an average particle size of 5 μm or less) that are dry blended with the amorphous polymeric material. In an example, the antioxidant may be included in the build material composition in an amount ranging from about 0.01 wt % to about 5 wt %, based on the total weight of the build material composition. In other examples, the antioxidant may be included in the build material composition in an amount ranging from about 0.01 wt % to about 2 wt % or from about 0.2 wt % to about 1 wt %, based on the total weight of the build material composition.

Antistatic agent(s) may be added to the build material composition to suppress tribo-charging. Examples of suitable antistatic agents include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available antistatic agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the antistatic agent is added in an amount ranging from greater than 0 wt % to less than 5 wt %, based upon the total weight of the build material composition.

In some instances, the build material composition may also include one or more additives selected based on the application for the 3D object/part. In one example, carboxymethyl cellulose (CMC) may be added to the build material composition. In one example, this additive may be used with polyvinyl alcohol (PVA) as the amorphous polymeric material. The weight ratio of the CMC:PVA may range from about 20:80 to about 80:20. This build material composition may be used in the examples disclosed herein to create 3D printed hydrogels, which may be suitable for use in drug delivery devices, as super absorbent materials, etc.

Crosslinking Composition

Disclosed herein is a crosslinking composition that includes a crosslinking agent. The crosslinking composition also includes an aqueous vehicle that renders the crosslinking agent inkjettable via thermal inkjet printheads, piezoelectric inkjet printheads, or both.

The crosslinking agent is selected to crosslink with the amorphous polymeric material in portion(s) of a build material layer where it is desirable to yield a crosslinked polymer network. As such, the selection of the crosslinking agent depends upon the amorphous polymeric material included in the build material composition.

In some examples, the crosslinking agent is a multifunctional carboxylic acid or a multifunctional carboxylic acid salt. These crosslinking agents may be suitable for use with amorphous polymeric materials including hydroxyl (—OH) groups and/or double bonded oxygen atoms (═O) along the backbone chain.

In some examples, the terms "multifunctional carboxylic acid" and "multifunctional carboxylic acid salt" can be used interchangeably. The form of one compound over another can be a function of pH. As such, even if one form of the multifunctional carboxylic moiety (e.g., acid form or salt form) is used during preparation of the crosslinking composition, pH modifications during preparation can impact the nature of the moiety. Thus, the terms "multifunctional carboxylic acid" and "multifunctional carboxylic acid salt" should not be read so rigidly as to not consider relative pH levels, and other general chemistry concepts.

Multifunctional carboxylic acids include two, three, or four carboxylic acid (—COOH) groups, and may be referred to, respectively, as di-functional carboxylic acids, tri-functional carboxylic acids, and tetra-functional carboxylic acids. In an example, the multifunctional carboxylic acid is selected from the group consisting of citric acid, aspartic acid, glutamic acid, biphenyl-3,3',5,5'-tetracarboxylic acid, 1,2,3,4-butanetetracarboxylic acid, tricarballylic acid, 1,2,4-butanetricarboxylic acid, butanedioic acid, and combinations thereof. Salts of any of these acids may also be used. The counterion of the multifunctional carboxylic acid salt is selected from the group consisting of a sodium cation, a potassium cation, and an ammonium cation.

The amount of the crosslinking agent that is present in the crosslinking composition ranges from about 1 wt % to about 30 wt % based on the total weight of the crosslinking composition. In other examples, the amount of the crosslinking agent in the crosslinking composition ranges from about 5 wt % to 25 wt %, from about 10 wt % to about 20 wt %, or from about 1 wt % up to about 15 wt %.

As mentioned herein, the crosslinking composition also includes an aqueous vehicle. The aqueous vehicle may refer to the liquid in which the crosslinking agent is dispersed or dissolved to form the crosslinking composition. In some examples, the aqueous vehicle may consist of water (with no other components), or water and a water soluble or water miscible organic co-solvent (with no other components). In other examples, the aqueous vehicle may include other components, depending, in part, upon the applicator that is to be used to dispense the crosslinking composition. Examples of other suitable aqueous vehicle components include humectant(s), surfactant(s), antimicrobial agent(s), anti-kogation agent(s), chelating agent(s), and/or buffers.

Classes of organic co-solvents that may be used in the aqueous vehicle of the crosslinking composition include aliphatic alcohols, aromatic alcohols, diols, glycol ethers, polyglycol ethers, lactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, 1,6-hexanediol or other diols (e.g., 1,5-pentanediol, 2-methyl-1,3-propanediol, etc.), ethylene glycol alkyl ethers, propylene glycol alkyl ethers, higher homologs ($C_6$-$C_{12}$) of polyethylene glycol alkyl ethers, triethylene glycol, tetraethylene glycol, propylene glycol, tripropylene glycol methyl ether, N-alkyl caprolactams, unsubstituted caprolactams, 2-pyrrolidone, 1-methyl-2-pyrrolidone, N-(2-hydroxyethyl)-2-pyrrolidone, both substituted and unsubstituted formamides, both substituted and unsubstituted acetamides, and the like. Other examples of organic co-solvents include dimethyl sulfoxide (DMSO), isopropyl alcohol, ethanol, pentanol, acetone, or the like.

The co-solvent(s) may be present in the crosslinking composition in a total amount ranging from about 1 wt % active to about 50 wt % active based upon the total weight of the crosslinking composition, depending, at least in part, upon the jetting architecture of the applicator used to dispense the crosslinking composition. In an example, the total amount of the co-solvent(s) present in the crosslinking composition ranges from about is 2.5 wt % active to about 25 wt % active based on the total weight of the crosslinking composition.

As mentioned, the presence and amount of the co-solvent(s) may depend, in part, upon the jetting technology that is to be used to dispense the crosslinking composition. For example, if thermal inkjet printheads are to be used, water may make up 35% or more of the crosslinking composition. For another example, if piezoelectric inkjet printheads are to be used, water may make up from about 25 wt % to about 30 wt % of the crosslinking composition, and the co-solvent may make up 35 wt % or more of the crosslinking composition.

The aqueous vehicle may also include humectant(s). In an example, the total amount of the humectant(s) present in the crosslinking composition ranges from about 3 wt % to about 10 wt %, based on the total weight of the crosslinking composition. An example of a suitable humectant is ethoxylated glycerin having the following formula:

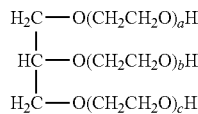

in which the total of a+b+c ranges from about 5 to about 60, or in other examples, from about 20 to about 30. An example of the ethoxylated glycerin is LIPONIC® EG-1 (LEG-1, glycereth-26, a+b+c=26, available from Lipo Chemicals).

In some examples, the aqueous vehicle includes surfactant(s) to improve the jettability of the crosslinking composition. Examples of suitable surfactants include a self-emulsifiable, non-ionic wetting agent based on acetylenic diol chemistry (e.g., SURFYNOL® SEF from Evonik Degussa), a non-ionic fluorosurfactant (e.g., CAPSTONE® fluorosurfactants, such as CAPSTONE® FS-35, from Chemours), and combinations thereof. In other examples, the surfactant is an ethoxylated low-foam wetting agent (e.g., SURFYNOL® 440 or SURFYNOL® CT-111 from Evonik Degussa) or an ethoxylated wetting agent and molecular defoamer (e.g., SURFYNOL® 420 from Evonik Degussa). Still other suitable surfactants include non-ionic wetting agents and molecular defoamers (e.g., SURFYNOL® 104E from Evonik Degussa) or water-soluble, non-ionic surfactants (e.g., TERGITOL™ TMN-6, TERGITOL™ 15-S-7, or TERGITOL™ 15-S-9 (a secondary alcohol ethoxylate) from The Dow Chemical Company or TEGO® Wet 510 (an organic surfactant available from Evonik Degussa). Yet another suitable surfactant includes alkyldiphenyloxide disulfonate (e.g., the DOWFAX™ series, such a 2A1, 3B2, 8390, C6L, C10L, and 30599, from The Dow Chemical Company).

Whether a single surfactant is used or a combination of surfactants is used, the total amount of surfactant(s) in the crosslinking composition may range from about 0.01 wt % active to about 10 wt % active based on the total weight of the crosslinking composition. In an example, the total amount of surfactant(s) in the fusing agent may be about 0.8 wt % active based on the total weight of the crosslinking composition.

An anti-kogation agent may be included in the crosslinking composition that is to be jetted using thermal inkjet printing. Kogation refers to the deposit of dried printing liquid (e.g., crosslinking composition) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol).

Whether a single anti-kogation agent is used or a combination of anti-kogation agents is used, the total amount of anti-kogation agent(s) in the crosslinking composition may range from greater than 0.20 wt % to about 0.65 wt % based on the total weight of the crosslinking composition.

The aqueous vehicle may also include antimicrobial agent(s). Suitable antimicrobial agents include biocides and fungicides. Example antimicrobial agents may include the NUOSEPT™ (Troy Corp.), UCARCIDE™ (Dow Chemical Co.), ACTICIDE® B20 (Thor Chemicals), ACTICIDE® M20 (Thor Chemicals), ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from Dow Chemical Co.).

In an example, the crosslinking composition may include a total amount of antimicrobial agents that ranges from about 0.05 wt % to about 1 wt %. In an example, the antimicrobial agent(s) is/are a biocide(s) and is/are present in the crosslinking composition in an amount of about 0.25 wt % (based on the total weight of the crosslinking composition).

Chelating agents (or sequestering agents) may be included in the aqueous vehicle to eliminate the deleterious effects of heavy metal impurities. Examples of chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the crosslinking composition may range from greater than 0 wt % to about 2 wt % based on the total weight of the crosslinking composition. In an example, the chelating agent(s) is/are present in the crosslinking composition in an amount of about 0.04 wt % (based on the total weight of the crosslinking composition).

The pH of the crosslinking composition may range from about 2 to about 9. A buffer may also be added to the crosslinking composition, for example, to help maintain the pH of the composition, i.e., to prevent undesirable changes in the pH. Examples of buffers include TRIS (tris(hydroxymethyl)aminomethane or TRIZMA®), bis-tris propane, TES (2-[(2-Hydroxy-1,1-bis(hydroxymethyl)ethyl) amino]ethanesulfonic acid), MES (2-ethanesulfonic acid), MOPS (3-(N-morpholino)propanesulfonic acid), HEPES (4-(2-hydroxyethyl)-1-piperazineethanesulfonic acid), DIPSO (3-(N,N-Bis[2-hydroxyethyl]amino)-2-hydroxypropane-sulfonic acid), Tricine (N-[tris(hydroxymethyl)methyl]glycine), HEPPSO (β-Hydroxy-4-(2-hydroxyethyl)-1-piperazinepropanesulfonic acid monohydrate), POPSO (Piperazine-1,4-bis(2-hydroxypropanesulfonic acid) dihydrate), EPPS (4-(2-Hydroxyethyl)-1-piperazinepropanesulfonic acid, 4-(2-Hydroxyethyl)piperazine-1-propanesulfonic acid), TEA (triethanolamine buffer solution), Gly-Gly (Diglycine), bicine (N,N-Bis(2-hydroxyethyl)glycine), HEPBS (N-(2-Hydroxyethyl)piperazine-N'-(4-butanesulfonic acid)), TAPS ([tris(hydroxymethyl)methylamino]propanesulfonic acid), AMPD (2-amino-2-methyl-1,3-propanediol), TABS (N-tris(Hydroxymethyl)methyl aminobutanesulfonic acid), or the like.

Whether a buffer is used or a combination of buffers is used, the total amount of buffer(s) in the crosslinking composition may range from greater than 0 wt % active to about 0.5 wt % active based on the total weight of the crosslinking composition. In an example, the buffer(s) is/are present in the crosslinking composition in an amount of about 0.1 wt % active (based on the total weight of the crosslinking composition).

The balance of the crosslinking composition is water (e.g., deionized water, purified water, etc.), which as described herein, may vary depending upon the other components in the crosslinking composition. In one example, the crosslinking composition is jettable via a thermal inkjet printhead, and includes from about 30 wt % to about 85 wt % water.

In an example, the crosslinking composition is at least substantially colorless. These examples are devoid of a colorant (e.g., pigment and/or dye). As such, the crosslinking composition minimally affects, or does not affect the color of the build material composition or the final 3D printed object.

In another example, a colorant may be added to the crosslinking composition. This enables the resulting 3D printed object to be colored, e.g., without having to use a separate coloring agent.

Any pigment and/or dye that can be dispersed or dissolved in the crosslinking composition may be included in the crosslinking composition. Any of the colors set forth herein for the coloring agent colorant may be used.

When included, the pigment may be added in an amount ranging from about 1 wt % to about 10 wt %, and/or the dye may be added in an amount ranging from about 1 wt % to about 7 wt %.

3D Printing Kits

The build material composition described herein may be part of a 3D printing kit. In an example, the kit for three-dimensional (3D) printing, comprises: a build material composition including an amorphous polymeric material; and a crosslinking composition to be applied to at least a portion of the build material composition during 3D printing, the crosslinking composition including a crosslinking agent to crosslink with the amorphous polymeric material in the at least the portion, to yield a crosslinked polymer network.

Any example of the build material composition and of the crosslinking composition may be used in the kit. In one example, the amorphous polymeric material (of the build material composition) is white, and the crosslinking composition is substantially colorless. In one example, the amorphous polymeric material is selected from the group consisting of polyvinyl alcohol, polyhydroxyethyl methacrylate, polyhydroxyethyl acrylate, polyvinyl acetate, copolymers thereof, and combinations thereof; and the crosslinking agent is selected from the group consisting of a multifunctional carboxylic acid, a multifunctional carboxylic acid salt, and combinations thereof. In another example, the amorphous polymeric material (of the build material composition) is white, and the crosslinking composition is colored. In some examples, the kit may consist of the build material composition and the crosslinking composition with no other components.

In other examples, the kit may also include a separate coloring agent. As one specific example, the kit for three-dimensional (3D) printing, comprises: a build material composition including an amorphous polymeric material; an inkjettable crosslinking composition to be applied to at least a portion of the build material composition during 3D printing, the crosslinking composition including a multifunctional carboxylic acid crosslinking agent to crosslink with the amorphous polymeric material in the at least the portion, to yield a crosslinked polymer network; and a colored ink to be applied with the crosslinking composition and/or to a surface of the crosslinked polymer network. In this example, the amorphous polymeric material (of the build material composition) is white, and the crosslinking composition is substantially colorless.

It is to be understood that the components of the kits may be maintained separately until used together in examples of the 3D printing method disclosed herein.

Coloring Agent

In any the examples of the 3D printing kit and/or the 3D printing method disclosed herein, a coloring agent may be used. The coloring agent may include a colorant, a co-solvent, and a balance of water. In some examples, the coloring agent consists of these components, and no other components. In some other examples, the coloring agent may further include a binder (e.g., an acrylic latex binder, which may be a copolymer of any two or more of styrene, acrylic acid, methacrylic acid, methyl methacrylate, ethyl methacrylate, and butyl methacrylate) and/or a buffer. In still other examples, the coloring agent may further include additional components, such as dispersant(s) (e.g., polymer or small molecule dispersants), humectant(s), surfactant(s), anti-kogation agent(s), antimicrobial agent(s), and/or chelating agent(s). Any example of the humectant(s), surfactant(s), anti-kogation agent(s), antimicrobial agent(s), and/or chelating agent(s) described herein for the crosslinking agent may be used in the coloring agent.

The coloring agent may be a black agent, a cyan agent, a magenta agent, or a yellow agent. As such, the colorant (pigment and/or dye) may be a black colorant, a cyan colorant, a magenta colorant, a yellow colorant, or a combination of colorants that together achieve a black, cyan, magenta, or yellow color.

An example of the pigment based coloring agent may include from about 1 wt % to about 10 wt % of pigment(s), from about 10 wt % to about 30 wt % of co-solvent(s), from about 1 wt % to about 10 wt % of dispersant(s), from about 0.1 wt % to about 5 wt % of binder(s), from 0.01 wt % to about 1 wt % of anti-kogation agent(s), from about 0.05 wt % to about 0.1 wt % antimicrobial agent(s), and a balance of water. An example of the dye based coloring agent may include from about 1 wt % to about 7 wt % of dye(s), from about 10 wt % to about 30 wt % of co-solvent(s), from about 1 wt % to about 7 wt % of dispersant(s), from about 0.05 wt % to about 0.1 wt % antimicrobial agent(s), from 0.05 wt % to about 0.1 wt % of chelating agent(s), from about 0.005 wt % to about 0.2 wt % of buffer(s), and a balance of water.

Some examples of the coloring agent include a set of cyan, magenta, and yellow agents, such as C1893A (cyan), C1984A (magenta), and C1985A (yellow); or C4801A (cyan), C4802A (magenta), and C4803A (yellow); all of which are available from HP Inc. Other commercially available coloring agents include C9384A (printhead HP 72), C9383A (printhead HP 72), C4901A (printhead HP 940), and C4900A (printhead HP 940).

Printing Methods

Referring now to FIG. 1, an example a method 100 for 3D printing is depicted. The example of the method 100 may use an example of the 3D printing kit disclosed herein.

As shown in FIG. 1, the method 100 for three-dimensional (3D) printing comprises: applying a build material composition to form a build material layer, the build material composition including an amorphous polymeric material (reference numeral 102); and based on a 3D object model, selectively applying a predetermined amount of a crosslinking agent on at least a portion of the build material composition; wherein the crosslinking agent crosslinks with the amorphous polymeric material in the at least the portion, to yield a crosslinked polymer network to form a layer of a 3D part (reference numeral 104).

Prior to execution of the method 100, it is to be understood that a controller may access data stored in a data store pertaining to a 3D object that is to be printed. For example, the controller may determine the number of layers of the build material composition that are to be formed, the locations at which any of the agents is/are to be deposited on each of the respective layers, etc.

Figure 2:
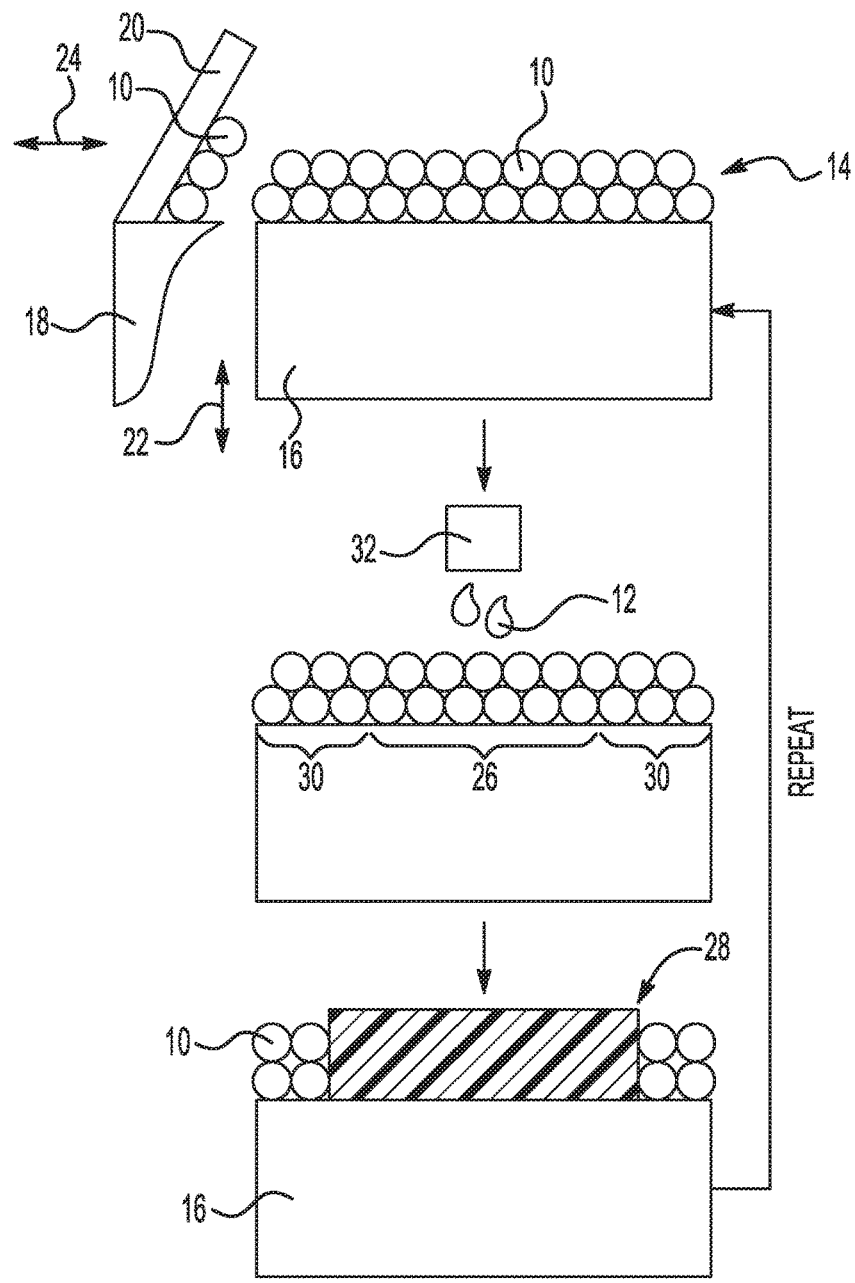
FIG. 2 is a schematic illustration of an example of the method for 3D printing.

Referring now to FIG. 2, an example of the method 100, which utilizes the build material composition 10 (including the amorphous polymeric material) and the crosslinking composition 12 is graphically depicted.

In FIG. 2, a layer 14 of the build material composition 10 is applied on a build area platform 16. A printing system may be used to apply the build material composition 10. The printing system may include the build area platform 16, a build material supply 18 containing the build material composition 10, and a build material distributor 20.

The build area platform 16 receives the build material composition 10 from the build material supply 18. The build area platform 16 may be moved in the directions as denoted by the arrow 22, e.g., along the z-axis, so that the build material composition 10 may be delivered to the build area platform 16 or to a previously formed layer. In an example, when the build material composition 10 is to be delivered, the build area platform 16 may be programmed to advance (e.g., downward) enough so that the build material distributor 20 can push the build material composition 10 onto the build area platform 16 to form a substantially uniform layer of the build material composition 10 thereon. The build area platform 16 may also be returned to its original position, for example, when a new layer is to be formed and/or when a new part is to be built.

The build material supply 18 may be a container, bed, or other surface that is to position the build material composition 10 between the build material distributor 20 and the build area platform 16. The build material supply 18 may include heaters so that the build material composition 10 is heated to a supply temperature ranging from about 25° C. to about 50° C. In these examples, the supply temperature may depend, in part, on the build material composition 10 used and/or the 3D printer used. As such, the range provided is one example, and higher or lower temperatures may be used.

The build material distributor 20 may be moved in the directions as denoted by the arrow 24, e.g., along the y-axis, over the build material supply 20 and across the build area platform 18 to spread the layer 14 of the build material composition 10 over the build area platform 16. The build material distributor 20 may also be returned to a position adjacent to the build material supply 18 following the spreading of the build material composition 10. The build material distributor 20 may be a blade (e.g., a doctor blade), a roller, a combination of a roller and a blade, and/or any other device capable of spreading the build material composition 10 over the build area platform 16. For instance, the build material distributor 20 may be a counter-rotating roller. In some examples, the build material supply 18 or a portion of the build material supply 18 may translate along with the build material distributor 22 such that build material composition 10 is delivered continuously to the build material distributor 20 rather than being supplied from a single location at the side of the printing system as depicted in FIG. 2.

The build material supply 18 may supply the build material composition 10 into a position so that it is ready to be spread onto the build area platform 16. The build material distributor 20 may spread the supplied build material composition 10 onto the build area platform 16. The controller (not shown) may process "control build material supply" data, and in response, control the build material supply 18 to appropriately position the particles of the build material composition 10, and may process "control spreader" data, and in response, control the build material distributor 20 to spread the build material composition 10 over the build area platform 16 to form the layer 14 of the build material composition 10 thereon. In FIG. 2, one build material layer 14 has been formed.

The layer 14 has a substantially uniform thickness across the build area platform 16. In an example, the build material layer 14 has a thickness ranging from about 50 μm to about 950 μm. In another example, the thickness of the build material layer 14 ranges from about 30 μm to about 300 μm. It is to be understood that thinner or thicker layers may also be used. For example, the thickness of the build material layer 14 may range from about 20 μm to about 500 μm. The layer thickness may be about 2× (i.e., 2 times) the average diameter of the amorphous polymeric material particles at a minimum for finer part definition. In some examples, the layer 14 thickness may be about 1.2× the average diameter of the amorphous polymeric material particles.

The build material layer 14 may be exposed to heat throughout at least some of the method 100. In one example, the build area platform 16 may be pre-heated prior to the layer 14 being formed thereon. In another example, heating may be initiated after the layer 14 is formed and prior to further processing. It is to be understood that heating may be maintained throughout the method 100, including, for example, when the crosslinking composition 12 is applied on at least a portion 26 of the layer 14.

In an example, the heating temperature may be a temperature that is sufficient to initiate or enhance the crosslinking reaction between the amorphous polymeric material and the crosslinking agent in the crosslinking composition 12. As such, the heating temperature refers to the temperature of the particles of the build material composition 10. The heating temperature of the surrounding environment may be within this range or slightly higher in order to bring the particles of the build material composition 10 within the desired range. In an example, the method 100 is accomplished at a temperature ranging from about 80° C. to about 140° C. As such, the heating temperature may range from about 80° C. to about 140° C. In another example, the heating temperature ranges from about 110° C. to about 130° C.

Heating may be accomplished by using any suitable heat source that exposes all of the build material composition 10 in the layer 14 to the heat. Examples of the heat source include a thermal heat source (e.g., a heater (not shown) integrated into the build area platform 16 (which may include sidewalls)).

After the layer 14 is formed and desired heating temperature is reached, the crosslinking composition 12 is selectively applied on at least some (e.g., portion 26) of the build material composition 10 in the layer 14. To form the layer 28 of a 3D object, at least a portion (e.g., portion 26) of the layer 14 of the build material composition 10 is patterned with the crosslinking composition 12.

The volume of the crosslinking composition 12 that is applied per unit of the build material composition 10 in the patterned portion 26 may delivery a sufficient amount of the crosslinking agent to crosslink the amorphous polymeric material in the portion 26. The volume of the crosslinking composition 12 that that is applied per unit of the build material composition 10 may depend, at least in part, on the crosslinking agent used, the crosslinking agent loading in the crosslinking composition 12, and the build material composition 10 used. In an example, the volume of the crosslinking composition 12 that is applied is sufficient to deliver the crosslinking agent so that a weight ratio of the applied crosslinking agent to the portion 26 of the build material composition 10 ranges from about 0.1:100 (0.001) to about 30:100 (3:10 or 0.3).

The portion(s) 30 of the build material layer 14 are not patterned with crosslinking composition 12, and thus are not to become part of the final 3D object layer 28.

In examples of the method 100, the crosslinking composition 12 may be dispensed from an applicator 32. The applicator 32 may be a thermal inkjet printhead, a piezoelectric printhead, a continuous inkjet printhead, etc., and the selective application of the crosslinking composition 12 may be accomplished by thermal inkjet printing, piezo electric inkjet printing, continuous inkjet printing, etc. The controller may process data, and in response, control the applicator 32 to deposit the crosslinking composition 12 onto predetermined portion(s) 26 of the build material composition 10.

It is to be understood that the selective application of the crosslinking composition 12 may be accomplished in a single printing pass or in multiple printing passes. In some examples, the crosslinking composition 12 is selectively applied in a single printing pass. In some other examples, the crosslinking composition 12 is selectively applied in multiple printing passes. In one of these examples, the number of printing passes ranges from 2 to 4. It may be desirable to apply the crosslinking composition 12 in multiple printing passes to increase the amount, e.g., of the crosslinking agent, detailing agent, etc. that is applied to the build material composition 10, while also avoiding liquid splashing, displacement of the build material composition 10, etc.

Because the layer 14 is heated when the crosslinking composition 12 is applied, the crosslinking reaction within the portion 26 is immediately initiated when the crosslinking composition 12 comes into contact with the amorphous polymeric material in the build material composition 10. As such, no additional energy exposure or processing is performed. The crosslinking reaction forms the 3D object layer 28, which is composed of a crosslinked polymer network.

The method 100 may further include repeating the applying of the build material composition 10, and the selectively applying of the crosslinking composition 12, wherein the repeating forms the 3D part/object including the layer 28.

As one example, after the 3D object layer 28 is formed, additional layer(s) may be formed thereon to create an example of the 3D object/part. To form the next layer, additional build material composition 10 may be applied on the layer 28. The crosslinking composition 12 is then selectively applied on at least a portion 26 of the additional build material composition 10, according to the 3D object model. Heating is performed as the crosslinking composition 12 is applied, and thus the crosslinking reaction takes place to form the next 3D object layer. The application of additional build material composition 10, the selective application of the crosslinking composition 12, and the heating may be repeated a predetermined number of cycles to form the final 3D object in accordance with the 3D object model.

As such, examples of the method 100 include iteratively applying individual build material layers 14 of the build material composition 10; based on the 3D object model, selectively applying the crosslinking composition 12 to at least some of the individual build material layers 14; and heating throughout the method to define individually crosslinked 3D object layers 28.

The build material composition 10 that does not become part of the 3D object (e.g., the build material composition in portion(s) 32) may be reclaimed to be reused as build material in the printing of another 3D object.

To impart color to the 3D object, the coloring agent may be applied with the crosslinking agent 12 and/or on the outermost layer after the 3D object/part is formed. The coloring agent may be applied by a separate applicator or by the same applicator as the crosslinking composition 12, which includes several individual cartridges for dispensing the respective composition 12 and agent.

In any of the examples of the method 100 disclosed herein, differently shaped objects may be printed in different orientations within the printing system. As such, while the object may be printed from the bottom of the object to the top of the object, it may alternatively be printed starting with the top of the object to the bottom of the object, or from a side of the object to another side of the object, or at any other orientation that is suitable or desired for the particular geometry of the part being formed.

3D Printed Objects

The 3D printed object/part includes several crosslinked layers 28. When the coloring agent is not applied during or after printing, the 3D printed object/part is white. The white color of the 3D printed object/part is due to the fact that the amorphous polymeric material is white, and the crosslinking composition 12 is substantially colorless. Thus, the white color of the amorphous polymeric material in the build material composition 10 is imparted to the 3D printed object/part. In an example, the 3D part exhibits an $L^*$ value ranging from about 80 to about 95, and wherein the 3D part exhibits a $b^*$ value of less than 5. In another example, the 3D part exhibits an $L^*$ value ranging from about 88 to about 93, and wherein the 3D part exhibits a $b^*$ value of less than 5.

To further illustrate the present disclosure, examples are given herein. It is to be understood these examples are provided for illustrative purposes and are not to be construed as limiting the scope of the present disclosure.

EXAMPLES

Example 1

An example of the crosslinking composition (Ex. CLC) disclosed herein was prepared. The example crosslinking agent included in the example crosslinking composition was citric acid trisodium salt. The general formulation of the example crosslinking composition is shown in Table 1, with the % active of each component and the total wt % each component that was used.

TABLE 1

| Ingredient | Specific Component | % active of the component | Ex. CLC (wt %) |
|---|---|---|---|
| Crosslinking agent | Citric acid trisodium salt | 100 | 10 |

TABLE 1-continued

| Ingredient | Specific Component | % active of the component | Ex. CLC (wt %) |
|---|---|---|---|
| Co-solvent | Propylene glycol | 99 | 5 |
| Surfactant | TERGITOL ® 15-S-12 | 100 | 0.8 |
| Water | Deionized water | 100 | Balance |

The ingredients were mixed together. The resulting solution was colorless.

The jettability performance of the Ex. CLC was tested. A magenta dye (less than 1 wt %) was included in the Ex. CLC for visibility during the test. The colored Ex. CLC was printed on paper from a thermal inkjet printhead. A decap plot was printed with the colored Ex. CLC and the prints were visually evaluated for missing lines. While not reproduced herein, the decap plot showed excellent nozzle health. The decap was also tested by waiting for predetermined time periods before printing another decap plot. The colored Ex. CLC could be reliability reproduced with predetermined time periods up to 16 seconds.

The decap plot and the decap time indicates that the Ex. CLC is particularly suitable for being inkjet printed.

Example 2

The Ex. CLC was used in a 3D printing process as described herein. The Ex. CLC has the formulation set forth in Table 1, and thus did not include any magenta dye. The build material composition included polyvinyl alcohol particles, where the PVA had a weight average molecular weight ranging from about 20,000 to about 30,000.

A small testbed 3D printer was used. The build platform was heated to about 130° C. The PVA build material composition was spread on the heated build platform, and Ex. CLC was thermally inkjetted in the shape of a dogbone at a weight ratio of about 1 (citric acid) to 100 (PVA powder). This process was repeated to form eight layers in the z-direction.

Figure 3:
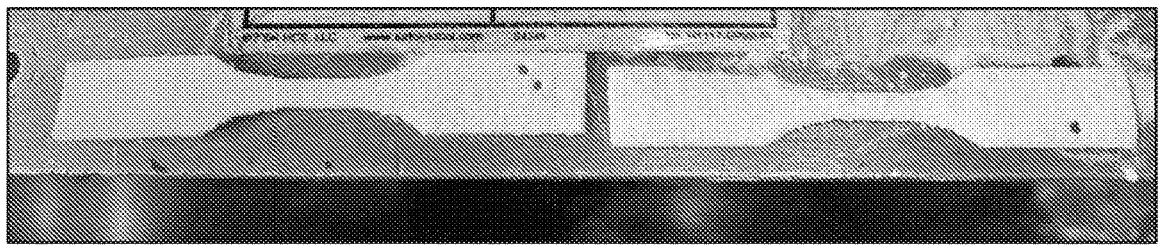
FIG. 3 is a black and white version of an originally colored photograph of example dogbones printed using an example of the method disclosed herein.

When printing was stopped, the dogbones were able to be separated from the build material composition that was not exposed to the Ex. CLC. The dogbones were collected for visual analysis and imaging. FIG. 3 illustrates a black and white reproduction of the original photographs of two of the 3D printed dogbones. The results indicate that the amorphous build material was able to be crosslinked on the voxel level and in a manner sufficient to form a 3D printed part with enough mechanical strength to be handled.

The color of the dogbones was evaluated for L* (degree of whiteness) and b* (degree of yellowing). A color meter was used at a setting of D65 and 10°, which means reflectance measured with daylight filter and at an aspecular angle of 10°. The L* values for the dogbones ranged from 88 to 93 and the b* values for the dogbones was less than 5. These results confirm that the 3D printed dogbones maintained the bright white color of the PVA and were not deleteriously affected by the citric acid crosslinking agent.

It is to be understood that the ranges provided herein include the stated range and any value or sub-range within the stated range. For example, from about 1 wt % to about 30 wt % should be interpreted to include not only the explicitly recited limits of from about 1 wt % to about 30 wt %, but also to include individual values, such as about 1.25 wt %, about 5 wt %, about 17 wt %, about 23 wt %, about 29.2 wt %, etc., and sub-ranges, such as from about 2 wt % to about 8 wt %, from about 5 wt % to about 25 wt %, from about 10 wt % to about 28 wt %, etc.

While several examples have been described in detail, it is to be understood that the disclosed examples may be modified. Therefore, the foregoing description is to be considered non-limiting.

What is claimed is:

1. A kit for three-dimensional (3D) printing, comprising:
   a build material composition including an amorphous polymeric material; and
   a crosslinking composition to be applied to at least a portion of the build material composition during 3D printing, the crosslinking composition including a crosslinking agent to crosslink with the amorphous polymeric material in the at least the portion, to yield a crosslinked polymer network,
   wherein the crosslinking agent is a multifunctional carboxylic acid selected from the group consisting of citric acid, aspartic acid, glutamic acid, biphenyl-3,3',5,5'-tetracarboxylic acid, 1,2,3,4-butanetetracarboxylic acid, tricarballylic acid, 1,2,4-butanetricarboxylic acid, butanedioic acid, and combinations thereof.

2. The kit as defined in claim 1 wherein the amorphous polymeric material is selected from the group consisting of polyvinyl alcohol, polyhydroxyethyl methacrylate, polyhydroxyethyl acrylate, polyvinyl acetate, copolymers thereof, and combinations thereof.

3. A kit for three-dimensional (3D) printing, comprising:
   a build material composition including an amorphous polymeric material; and
   a crosslinking composition to be applied to at least a portion of the build material composition during 3D printing, the crosslinking composition including an aqueous vehicle and a crosslinking agent to crosslink with the amorphous polymeric material in the at least the portion to yield a crosslinked polymer network,
   wherein the crosslinking agent is a multifunctional carboxylic acid salt, and wherein a counterion of the multifunctional carboxylic acid salt is selected from the group consisting of a sodium cation, a potassium cation, and an ammonium cation.

4. The kit as defined in claim 1 wherein the amorphous polymeric material has a weight average (Mw) molecular weight ranging from about 20,000 to about 500,000.

5. The kit as defined in claim 1 wherein the amorphous polymeric material is white, and wherein the crosslinking composition is substantially colorless.

6. The kit as defined in claim 1, further comprising
   a colored ink to be applied with the crosslinking agent, to a surface of the crosslinked polymer network, or both.

7. A method for three-dimensional (3D) printing, comprising:
   applying a build material composition to form a build material layer, the build material composition including an amorphous polymeric material; and
   based on a 3D object model, selectively applying a predetermined amount of a crosslinking composition on at least a portion of the build material composition;
   wherein the crosslinking composition includes a crosslinking agent that crosslinks with the amorphous polymeric material in the at least the portion to yield a crosslinked polymer network to form a layer of a 3D part,
   and wherein one of:
   i) the crosslinking agent is selected from the group consisting of citric acid, aspartic acid, glutamic acid, biphenyl-3,3',5,5'-tetracarboxylic acid, 1,2,3,4-butanetetracarboxylic acid, tricarballylic acid, 1,2,4-butanetricarboxylic acid, butanedioic acid, and combinations thereof, or ii) the crosslinking composition further includes an aqueous vehicle and the crosslinking agent is a multifunctional carboxylic acid salt, wherein a counterion of the multifunctional carboxylic acid salt is selected from the group consisting of a sodium cation, a potassium cation, and an ammonium cation.

8. The method as defined in claim 7 wherein the method is accomplished at a temperature ranging from about 80° C. to about 140° C.

9. The method as defined in claim 7 wherein the amorphous polymeric material is selected from the group consisting of polyvinyl alcohol, polyhydroxyethyl methacrylate, polyhydroxyethyl acrylate, polyvinyl acetate, copolymers thereof, and combinations thereof.

10. The method as defined in claim 9 wherein the aqueous vehicle of the crosslinking composition includes water and a surfactant.

11. The method as defined in claim 7 wherein a weight ratio of the applied crosslinking agent to the portion of the build material composition ranges from about 0.1:100 to about 30:100.

12. The method as defined in claim 7, further comprising repeating the applying of the build material composition, and the selectively applying of the crosslinking agent, wherein the repeating forms the 3D part including the layer.

13. The method as defined in claim 12 wherein the 3D part exhibits an L* value ranging from about 80 to about 95, and wherein the 3D part exhibits a b* value of less than 5.

14. The kit as defined in claim 3 wherein the amorphous polymeric material is selected from the group consisting of polyvinyl alcohol, polyhydroxyethyl methacrylate, polyhydroxyethyl acrylate, polyvinyl acetate, copolymers thereof, and combinations thereof.

15. The kit as defined in claim 3 wherein the amorphous polymeric material has a weight average (Mw) molecular weight ranging from about 20,000 to about 500,000.

16. The kit as defined in claim 3 wherein the amorphous polymeric material is white, and wherein the crosslinking composition is substantially colorless.

* * * * *